May 5, 1931.

F. E. ARNDT

LEANING WHEEL GRADER

Re. 18,064

Original Filed Oct. 25, 1926 3 Sheets-Sheet 1

INVENTOR.

F. E. Arndt

BY Frederick S. Stitt

ATTORNEY.

May 5, 1931.
F. E. ARNDT
LEANING WHEEL GRADER
Re. 18,064
Original Filed Oct. 25, 1926 3 Sheets-Sheet 2
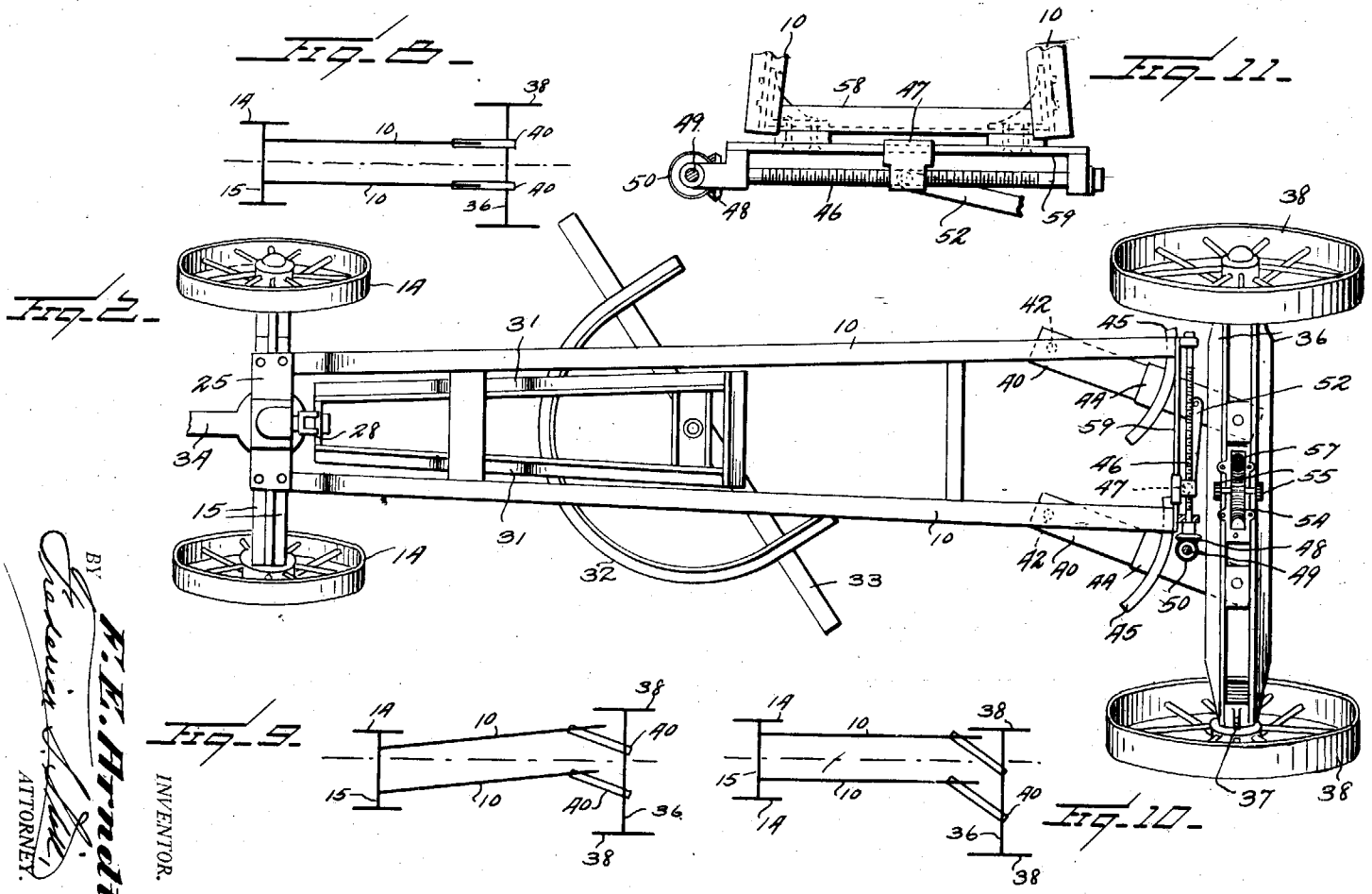
INVENTOR.
BY F. E. Arndt
Frederick S. Lee
ATTORNEY.

May 5, 1931. F. E. ARNDT Re. 18,064

LEANING WHEEL GRADER

Original Filed Oct. 25, 1926 3 Sheets-Sheet 3

INVENTOR.
F. E. Arndt
BY
Frederick L. Stell,
ATTORNEY.

Reissued May 5, 1931

Re. 18,064

UNITED STATES PATENT OFFICE

FRANKLIN E. ARNDT, OF GALION, OHIO, ASSIGNOR TO THE GALION IRON WORKS & MFG. CO., OF GALION, OHIO, A CORPORATION OF OHIO

LEANING WHEEL GRADER

Original No. 1,655,303, dated January 3, 1928, Serial No. 189,043, filed May 5, 1927. Application for reissue filed September 27, 1930. Serial No. 484,910.

This invention comprehends and relates to road graders and more especially to road graders of the leaning wheel type, in which the ground or traveling wheels can be canted or tilted to the left or to the right to prevent side draft and keep the machine effectually in line and up to the work in hand, this present application being a substitute for my abandoned application, Serial Number 144,035, filed October 25, 1926.

The invention has for its primary object a novel and very efficient leaning wheel grader in which the main framework of the machine is so constructed that it can be swung in the arc of a circle to the right or to the left as may be necessary, according to the conditions met with and a further object of the invention is to provide a grader in which the frame is formed in two sections, a front section and a rear section, with means whereby the sections may be disposed in angular relation to each other, these two sections being so constructed that the pivotal connection between these two sections lies entirely between the axles and that thus the effective load transmitting portions of the sections are disposed between the axles and the front sections do not extend rearward of the rear axle but terminate short of the rear axle, thus giving to the machine a wider swinging range than if the rear end of the front section extended over and was connected to the rear section rearward of the rear axle.

A further object is to provide means whereby, with this pivotal connection between the two sections, the sections may be stiffened against downward stresses in any relative position of the two sections.

With these and other objects in view, as will more fully appear as the description proceeds, reference is had to the accompanying drawings, wherein Figure 1 is a side elevation of a grader constructed in accordance with my invention;

Figure 2 is a top plan view thereof;

Figures 1, 6, 7:
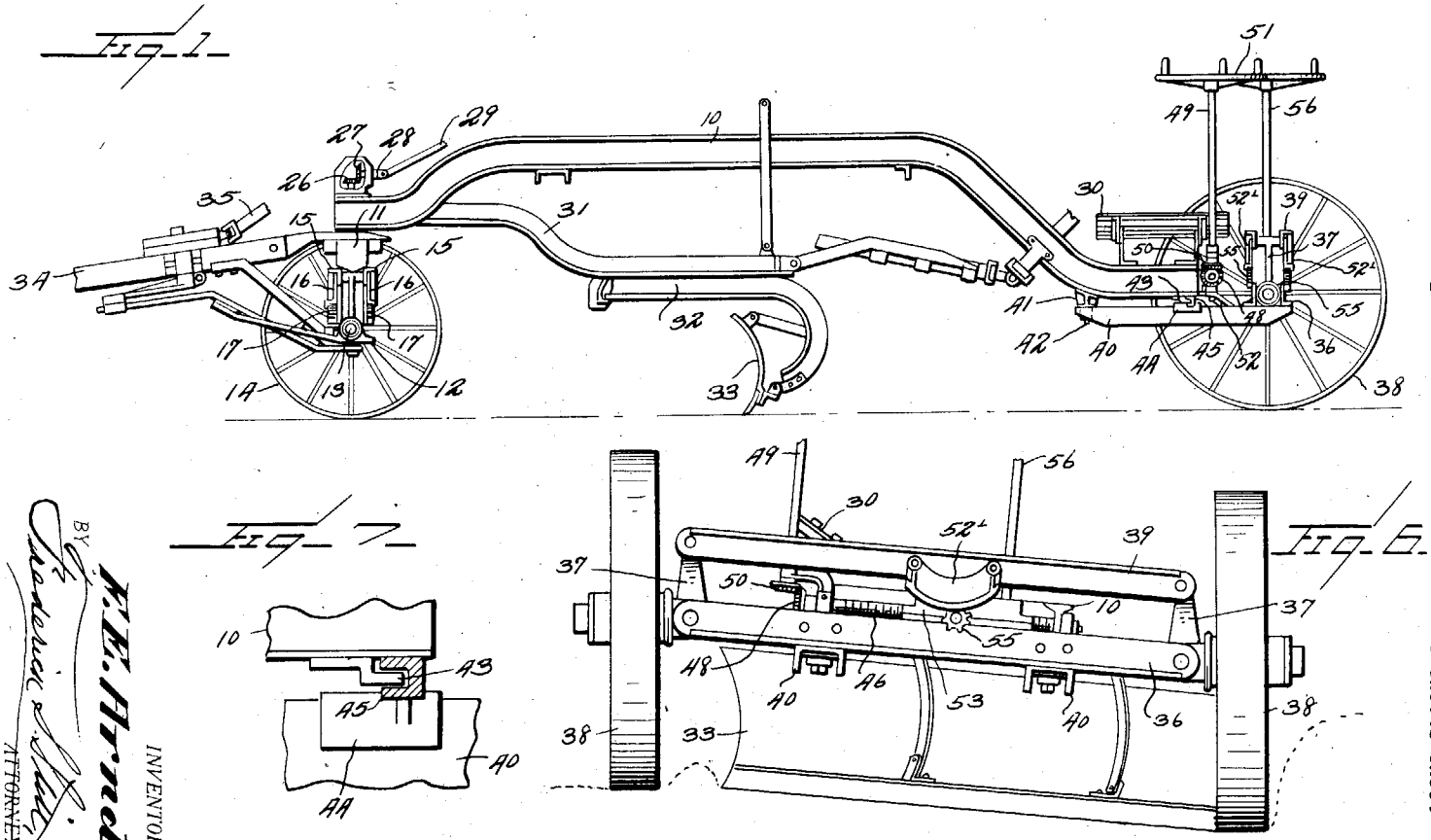
Figure 6 is a rear elevation of the machine, showing the frame and axle relatively shifted.
Figure 7 is a fragmentary section through the arcuate guide 45.
Figure 3:
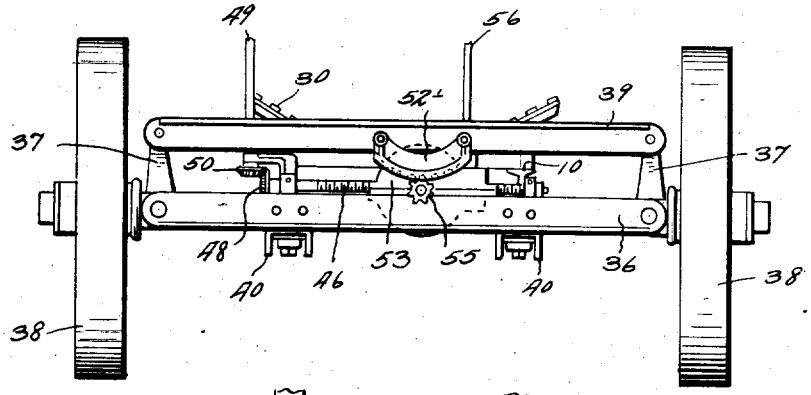
Figure 3 is a rear elevation.
Figure 5:
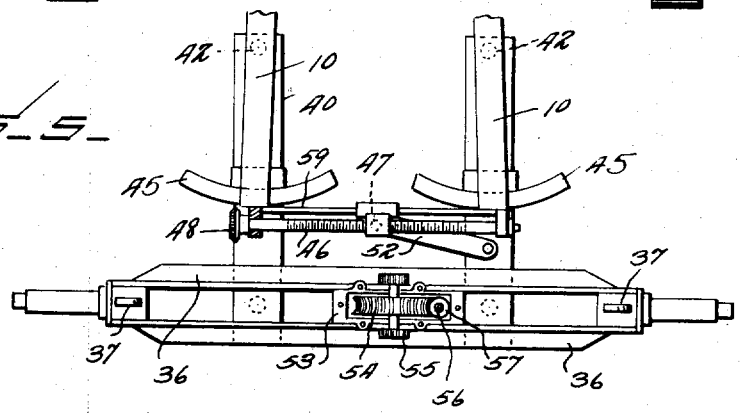
Figure 5 is an enlarged top plan view of the rear axle and a portion of the main frame.
Figure 4:
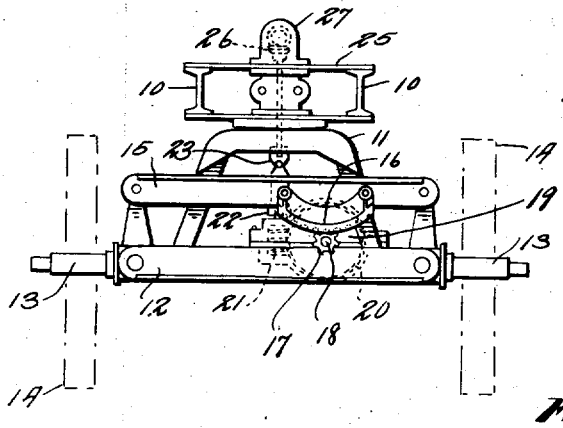
Figure 4 is a front elevation.

Figures 8, 9, and 10 are diagrammatic plan views and

Figure 11 is a fragmentary top plan view showing the preferred manner of mounting the screw 46 upon the main frame.

Referring to these drawings, 10 designates the longitudinally extending supporting I beams which constitute the main frame of the machine and also constitute the front section of the machine. These I-beams at their forward ends are rotatably mounted in any suitable manner upon a bolster 11 which extends downwardly and laterally and is operatively connected to the front axle 12.

This front axle is formed of two angle irons and disposed between these angle irons are the knuckles 13, the stubs of which support the forward wheels 14. The upwardly extending arms of the wheel supporting knuckles 13 are connected by means of two transversely extending angle irons 15. Both of these angle irons support upon them arcuate racks 16 formed upon their under faces with rack teeth and engaged by gear wheels 17 carried upon a shaft 18 extending into a housing 19, this shaft carrying upon it within the housing, a worm wheel 20 engaged by a worm 21 mounted in an extension of the housing, this worm forming part of a shaft formed of sections 22 and 23 extending upward through the transverse bars 25 carried on the I beams 10. This shaft at its upper end carries a beveled gear wheel 26, in turn actuated by a beveled gear wheel 27 on a shaft 28 which extends out through the housing and is operatively connected to the flexible actuating shaft 29, which extends rearward to the operator's platform 30 where it is connected to suitable operating means, as will be later described.

Pivoted to the forward ends of the arched I beams 10 are the draw bars 31 which extend rearward and downward and carry the usual circle. Engaged with this circle for rotative movement are the scraper or blade supporting beams 32 which at their rear ends extend downward and then forward and pivotally support the scraper 33. The scraper and its supporting means are such that the scraper may be tilted or may be rotated or otherwise adjusted. I do not wish to be limited to any particular means, as this forms no part of my invention, and any suitable scraper may be used, mounted in any suitable manner.

Operatively connected to the front axle is the tongue 34 which is swingable laterally by means of the flexible shaft 35 extending rearward to the operator's platform.

Swingable tongues of this nature are well known and form no part of my invention and, therefore, require no further description.

The rear axle is formed by two transversely extending angle irons 36 and this rear axle, while it supports the rear ends of the beams 10, is swingably connected to these beams. The two angle irons 36 are spaced from each other in any suitable manner and carry the knuckles 37 having stubs supporting the rear wheels 38. The upwardly extending arms of the knuckles are connected by means of the transverse bars 39 so that as these bars are shifted in one direction or the other, the wheels will be tilted or may be adjusted into vertical position by means later to be described.

The rear axle is connected to the frame beams 10 by means of link beams 40 which are formed of channel iron, these link beams 40 constituting the rear section of the frame. Each of these beams at its forward end is pivotally mounted against a spacing block 41, through which a bolt 42 passes, and which may engage the corresponding beam 10. This block 41 and the pivot bolt 42 are disposed at the point where the corresponding I beam extends downward and then rearward and about two feet in advance of the rear ends of the beams 10.

Attached to the under face of the rear end of each beam 10 is an angular lip 43 and each of the swinging beams 40 or links has mounted upon it a member 44 formed with an arcuate, transversely extending channel 45, which engages the angular lip 43 and prevents any downward movement of the link beam 40 with reference to the rear end of the main beam 10, but allows the swinging beam 40 to swing into an angular relation to the corresponding beam 10 without becoming disengaged from the beam 10.

It will be understood that while I prefer to use an arcuate member 45 mounted upon each link and engaging beneath the rear end of the corresponding main frame beam, I do not wish to be limited to this, as it is obvious that the angular lip 43 might be mounted upon the link and the arcuate member 45 be mounted upon the corresponding frame beam.

Operatively mounted upon one of the beams 10 is a transversely extending screw-threaded shaft 46 carrying a nut 47. This screw-threaded shaft also carries a beveled gear wheel 48 and mounted in a suitable bracket upon the end of the main frame formed by the beams 10, is a vertical operating shaft 49 which, at its lower end, carries a beveled gear wheel 50 engaging the beveled gear wheel 48. This operating shaft extends up adjacent the rear end of the operator's platform 30 and at its upper end carries the operating handle 51. The nut 47 is connected by a link 52 to one of the swinging beams 40, this link being pivoted to this swinging beam and as these beams 40 are each pivotally connected to the rear axle, it follows that as the nut 47 is shifted in one direction or the other, both of the swinging beams 40 will be swung in one direction or the other and the frame will be moved to the right or to the left in the arc of a circle. Thus the main frame may be held with its middle in coincidence with the draft line of the machine or with the swinging beams 40 disposed in angular relation to the beams 10, thus swinging or "angling" the main frame to any desired position within the range of the machine to the right or left.

For the purpose of canting or "leaning" the rear wheels, I mount upon the connecting bars 39 the arcuate racks 52′, and mount upon the rear axle the housing 53, wherein is disposed a worm wheel 54 the shaft of which carries pinions 55 which engage the racks. A vertical shaft 56 extends down through a lateral extension of the housing 53 and has upon it a worm 57 which engages the worm wheel 54. Thus when the operator turns this shaft 56, the pinion 55 will act to shift the racks 52′ and the connecting rods 39 laterally in one direction or the other to thus tilt the wheels.

It will be noticed that the mechanism for canting the front wheels and for canting the rear wheels each includes an arcuate rack. This is, of course, rendered necessary by the fact that when the connecting rod connecting the upwardly extending arms of the knuckles is in a middle position, it is distanced further from the operating pinion than when the connecting rod is shifted in one direction or the other to lean the wheels. This arcuate rack 52′ and the arcuate rack 16 compensate for this approach or recession of the connecting rod or rods to or from the operating pinion therefor.

It will be seen that with this construction the front wheels or the rear wheels, or both, may be leaned in one direction or the other and without regard to whether the frame is in its middle position or angled to one side or the other. By providing a laterally swinging or angling frame and providing leaning wheels, side thrust is counteracted as the wheels may be leaned against the load or strain and by leaning the wheels, the hub and edge of the tire is prevented from dragging down the bank, thus leaving a ragged looking cut.

It will be seen that the main frame, which is composed of the beams 10 and the continuations thereof constituted by the link beams 40, does not shift transversely on the rear axle, but is "angled" or swung in the arc of a circle, the rear supporting bars or link beams 40 having fixed pivotal points of connection with the rear axle and being entirely incapable of any transverse shifting movement upon the axle.

It is to be particularly noted that in my construction, the front section of the machine which is composed of the beams 10 does not extend over or rearward of the rear axle but terminates short of this rear axle so that the load transmitting portions of the front and rear sections are disposed entirely between the axles, thus giving a wider swinging range and a greater freedom of movement than would be the case if the front section composed of the members 10 extended over the rear axle and this front section was engaged with the rear section rearward of the rear axle.

It will, of course, be understood that in the foregoing description and accompanying drawings, all disclosures as to the mechanism for raising, lowering, tilting or otherwise adjusting the blade, is purposely omitted and that in actual practice this machine will be provided with manually controlled means for this purpose so that the scraper blade may be raised or lowered, shifted laterally in either direction, angled to any desired degree with relation to the line of draft, and tilted to any extent required.

While I do not wish to be limited to this, I preferably connect the two beams of the main frame at their rear ends by a cross bar 58 to which is bolted a guide bar 59 upon which the nut 47 slides, this guide bar 59 carrying the brackets which support the ends of screw-threaded shaft 46 and the vertical shaft 49.

It is necessary that the nut 47 be slidingly engaged with a guide bar 59 so as to prevent the nut from turning and eliminate any strain upon the pin connection of the nut and the link 52.

It will be obvious that the details of construction as illustrated might be modified in many ways without departing from the spirit of the invention as defined in the appended claims:

I claim:—

1. In an implement of the class described, wheel supported front and rear axles, a frame connecting said axles and comprising front and rear sections pivoted to each other and to the front and rear axles respectively for angling in substantially horizontal planes, the effective load transmitting portions of said sections lying entirely between the axles, and manually operable means for angling the sections of the main frame.

2. In an implement of the class described, wheel supported front and rear axles, a frame connecting the axles and comprising a front section pivoted to the front axle and a rear section pivoted to the rear axle on vertical axes, the adjacent ends of said sections being pivoted together on a vertical axis and one of the sections having a portion extending a distance along the other past their point of pivot connection but terminating short of the rear axle, said extending portion having a bearing on said other section to stiffen the frame against downward stresses, and manually operable means for angling the sections of the main frame.

3. In an implement of the class described, wheel supported front and rear axles, a frame connecting said axles and comprising front and rear sections pivoted to each other and to the front and rear axles respectively for angling in substantially horizontal planes, the rear end of the front section extending beyond the point of frame articulation but terminating in front of the rear axle and slidingly engaging the rear section, and manually operable means for angling the sections of the main frame.

4. In an implement of the class described, wheel supported front and rear axles, a frame connecting said axles and comprising front and rear sections pivoted to each other and to the front and rear axles respectively for angling in substantially horizontal planes, the rear end of the front section extending beyond the point of frame articulation but terminating in front of the rear axle above the rear section and slidingly engaging the latter, and manually operable means for angling the sections of the main frame.

5. An implement having a main frame formed of sections connected to each other for swinging movement in a horizontal plane, the forward axle having wheels and to which the main frame is pivotally connected, a rear axle to which the rear section of the main frame is pivotally connected, the rear axle being disposed rearward of the rear end of the forward section of the main frame, and means forward of the rear axle affording load supporting engagement between the rear end of the forward section of the main frame and the forward end of the rear section of the main frame.

6. An implement having a main frame formed of sections connected to each other for swinging movement in a horizontal plane, the forward axle having wheels and to which the main frame is pivotally connected, a rear axle to which the rear section of the main frame is pivotally connected, the rear axle being disposed rearward of the rear end of the forward section of the main frame, and means forward of the rear axle affording load supporting engagement between the rear end of the forward section of the main frame and the forward end of the rear section of the main frame, and comprising laterally extending supporting members on one of said sections and engaging the other section in all positions of the two sections.

7. An implement having a main frame formed of a forward section and a rear section, the rear section being pivotally connected to the forward section for swinging movement in a substantially horizontal plane, a forward axle having wheels and to which the forward section is pivotally connected and a rear axle to which the rear section is pivotally connected, the rear axle being disposed rearward of the rear end of the forward section.

8. An implement having a main frame formed of a forward section and a rear section, the rear section being pivotally connected to the forward section for swinging movement in a substantially horizontal plane, a forward axle having wheels and to which the forward section is pivotally connected and a rear axle to which the rear section is pivotally connected, the rear axle being disposed rearward of the rear end of the forward section, and means mounted on the rear end of the forward section whereby the rear section may be angled with reference to the forward section.

9. An implement having a main frame formed of a main section and a rear section pivotally connected thereto, a forward axle to which the main frame is pivoted, a rear axle carried by the rear section of the main frame, and manually operable means for angling the main frame, tiltable wheels carried by the rear axle, and manually operable means for tilting the wheels.

10. A grader comprising a main frame, including two longitudinally extending frame beams, two longitudinally extending link bars pivoted to the frame beams forward of their rear ends for oscillation laterally in either direction, means on the link bars and beams for slidingly engaging the link bars with the beams in any laterally adjusted position of the link bars, a rear axle pivotally mounted upon the rear ends of the link bars and disposed rearward of the main beams, and wheels carried upon said rear axle.

11. A grader comprising a main frame including two longitudinally extending frame beams, two longitudinally extending link bars pivoted to the frame beams forward of their rear ends for oscillation laterally in either direction, means on the link bars and beams for slidingly engaging the link bars with the beams in any laterally adjusted position of the link bars, a rear axle pivotally mounted upon the rear ends of the link bars and disposed rearward of the main beams, tiltable wheels mounted upon the ends of the rear axle, and means carried by the rear axle whereby the wheels may be manually tilted.

12. A grader comprising a main frame including two longitudinally extending frame beams two longitudinally extending link bars pivotally connected to the rear ends of the frame beams for lateral movement in a horizontal plane and in either direction and extending rearward of the rear ends of the frame beams, each of the frame beams and the corresponding link bar being formed to provide one an arcuate guide and the other having a lip engaging said guide, a rear axle pivoted to the extremities of the link bars, and tiltable wheels carried by said rear axle.

13. A grader comprising a main frame including two longitudinally extending frame beams, two longitudinally extending link bars pivotally connected to the rear ends of the frame beams for lateral movement in a horizontal plane and in either direction and extending rearward of the rear ends of the frame beams, each of the frame beams and the corresponding link bar being formed to provide, one an arcuate guide, and the other, having a lip engaging said guide, a rear axle formed of two transversely extending bars spaced from each other and operatively pivoted to the rear ends of the link bars, knuckles pivotally mounted between said axle bars at the extremities thereof, wheels carried by said knuckles, the knuckles being movable in a vertical plane to tilt the wheels, a connecting rod connecting the knuckles for unitary movement, and manually operable means mounted upon the rear axle for tilting said wheels.

14. A grader comprising a main frame, including two longitudinally extending frame beams, two longitudinally extending link bars pivotally connected to the frame beams forward of their rear ends but extending beyond the rear ends of the frame beams, and having lateral movement in a horizonal plane in either direction, each of the frame beams and the corresponding link bar being formed to provide one, an arcuate guide and the other a member engaging said guide whereby the frame beams have sliding, load supporting engagement with the link bars in all positions of the latter.

15. A grader comprising a main frame and two links pivotally engaged with the main frame and extending rearward thereof and having lateral movement in a horizontal plane in either direction, means on the main frame for shifting said links in either direction relative to the main frame, a rear axle formed of two transversely extending bars spaced from each other and operatively pivoted to the rear ends of the links, knuckles pivotally mounted between said rear axle bars, wheels carried by said knuckles, the knuckles being movable in a vertical plane to tilt the wheels, a connecting rod connecting the knuckles for unitary movement, and manually operable means mounted upon the rear axle for tilting said wheels.

16. A grader comprising a main frame, two longitudinally extending link bars pivotally connected to the rear ends of the frame beams for lateral movement in a horizontal plane and in either direction and extending rearward of the rear end of the main frame, a rear axle pivotally connected to the link bars and transversely movable therewith, and means for transversely shifting the link bars including a screw shaft mounted upon the main frame at the rear end thereof, an operating shaft for the screw shaft, a nut through which the screw passes, and a link operatively connecting the nut to one of said link bars.

17. A grader comprising a main frame including two longitudinally extending frame beams, two link bars pivotally engaged with the frame beams forward of the rear ends thereof for swinging movement in a horizontal plane, a rear axle pivotally connected to the link bars and transversely movable therewith, tiltable wheels mounted upon the rear axle, means carried on the rear axle for manually tilting said wheels, and means for transversely shifting the link bars including a screw shaft mounted upon the main frame at the rear end thereof, an operating shaft for the screw shaft, a nut through which the screw shaft passes, and a link operatively connecting the nut to one of said link bars.

In testimony whereof I hereunto affix my signature.

FRANKLIN E. ARNDT.